United States Patent [19]

Srivatsa

[11] 4,383,927

[45] May 17, 1983

[54] RECOVERY OF OIL FROM OILY SLUDGES

[75] Inventor: Sanjay R. Srivatsa, Naperville, Ill.

[73] Assignee: Nalco Chemical Company, Oak Brook, Ill.

[21] Appl. No.: 355,479

[22] Filed: Mar. 8, 1982

[51] Int. Cl.³ ............................................. B01D 17/04
[52] U.S. Cl. .................................. 210/708; 210/732; 210/737
[58] Field of Search ...................... 210/708, 764, 198.1, 210/734, 732, 737; 252/344, 341

[56] References Cited

U.S. PATENT DOCUMENTS

| | | | |
|---|---|---|---|
| 3,493,501 | 2/1970 | Eck | 210/732 |
| 4,138,446 | 2/1979 | Kawakami et al. | 210/734 |
| 4,179,369 | 12/1979 | Bradley et al. | 210/708 |

Primary Examiner—Charles N. Hart
Assistant Examiner—Wanda L. Millard
Attorney, Agent, or Firm—Richard L. Johnston

[57] ABSTRACT

A process is provided for enhancing oil recovery from an oily sludge containing a solid phase, an oil phase and a water phase by adding a positively charged latex flocculant to such sludge and immediately thereafter adding a chemical emulsion breaker which is negatively charged or nonionic, while controlling the proportions of said flocculant and said emulsion breaker to cause the entrapped oil phase to detach from the floc surface of the adsorptive solids and go into the water phase, and mechanically separating the oil from the solids and water.

9 Claims, No Drawings

RECOVERY OF OIL FROM OILY SLUDGES

BACKGROUND

In petroleum oil refinery processes refinery sludges are normally produced which contain various proportions of oil mixed with small amounts of solids and relatively large quantities of water. Sludges from various refinery processes are frequently mixed together. A composite sludge, for example, might contain by weight 2–4% solids, 6–51% oil and the remainder water.

These sludges are frequently produced in what is referred to as a dissolved air flotation process (DAF) where a chemical is added to waste water containing oil and solids and the water is treated with air under pressure. The air causes the solids and oil to float upward and the resultant sludge is raked out. The problem with which the present invention is concerned is the separation of the oil and water from the subject sludge.

High molecular weight polymeric flocculants have heretofore been employed in dewatering refinery DAF sludges. An example of such a process is one where the flocculant is added to a sludge which is then dewatered on a belt-type filter press. Substantial oil recovery has been achieved by this type of process. However, the results are apt to be erratic because there is no reliable method for screening the products for dewatering and enhancement of oil recovery on a sludge belt filter press (BFP).

It is, therefore, an object of this invention to provide a process of recovering oil from oil containing sludges, and especially sludges from petroleum refining, which enhances oil recovery and also increases the rate of dewatering.

BRIEF SUMMARY OF THE INVENTION

In accordance with the invention a process is provided for enhancing oil recovery from an oily sludge containing a solid phase, an oil phase and a water phase by adding a positively charged latex flocculant to such sludge and immediately thereafter adding a chemical emulsion breaker which is negatively charged or non-ionic, while controlling the proportions of said flocculant and said emulsion breaker to cause the entrapped oil phase to detach from the floc surface of the adsorptive solids and go into the water phase, and mechanically separating the oil from the solids and water.

DETAILED DESCRIPTION OF THE INVENTION

In general, the invention is particularly applicable to oily sludges and, especially petroleum refinery sludges, containing by weight 2–4% solids, 6–51% oil, and the remainder water. The sludges that are treated can also be classified as low oil sludges which contain by weight less than 10% oil and high oil sludges which contain by weight more than 10% oil, usually 20–50% oil. In most cases the water content will be within the range of 18% to 43% by weight but in low solids-low oil sludges it can be as high as 90% by weight.

In the best mode contemplated for the practice of the invention the flocculant used is a copolymer of methacrylamidopropyl trimethyl ammonium chloride (MAP-TAC) and acrylamide. These copolymers have high molecular weights of the order of ten million or more.

Another flocculant which can be effectively employed in the practice of the invention is the quaternary sulfate of dimethylaminoethylmethacrylate (DMAEM).

The emulsion breaker should be one which disperses freely in the continuous phase. In other words, if the continuous phase is water, the emulsion breaker should be one which disperses freely in water. If the continuous phase is oil, the emulsion breaker should be one which disperses freely in oil. A preferred water based emulsion breaker is ethoxylated fatty alcohol sulfate where the fatty alcohol contains 6–10 carbon atoms and the ethylene oxide content is about 60% by weight.

A preferred oil based emulsion breaker is an ethoxylated nonyl phenol, for example, nonylphenol ethoxylated with 12 moles of ethylene oxide and dissolved in a 50% by weight concentration in heavy aromatic naphtha having a boiling point higher than xylene.

It should be noted that in the examples given above the water based emulsion breaker is anionic and the oil based emulsion breaker is nonionic.

It will be understood that other flocculants and other emulsion breakers having the aforementioned characteristics can be employed in the practice of the invention.

The temperature used in the process is result effective, the best results being obtained at temperatures of 120° F. or higher.

The best results are also obtained by concentrating low oil content sludges prior to the aforementioned treatment.

Dosage of the flocculant is also an important factor. The amount of flocculant should be sufficient to produce incipient flocculation and the emulsion breaker should be added immediately following the flocculant. The dosage of flocculant required to produce this state also corresponds to the dosage which will produce approximately the maximum dewatering rate.

The invention will be further illustrated but is not limited by the following examples in which the quantities are by weight unless otherwise indicated.

EXAMPLES

In a standard belt filter press (BFP) used for recovering oil from an oily aqueous sludge, the raw sludge is placed in a twin pitch bladed turbine mixing vessel and treated with the desired conditioning treatment. The conditioned sludge then passes to a gravity drainage section where an oily filtrate is separated and passed to a holding tank for separation of oil and water. The loose cake from the oil filtrate is thus separated and is passed through a wedge/nip section at low pressure of 2–4 psi where more oily filtrate is separated and passed to the aforesaid holding tank. The loose cake from the wedge-nip section is then passed to a high compression section. Oily sludges do not withstand high compression. Hence, the pressure in this section is normally maintained below 5–6 psi and the oily filtrate from this section is also passed to the holding tank for separation of oil and water.

Most of the dewatering occurs in the gravity drainage section where the conditioned sludge is fed over a belt fabric. When the loose cake from the gravity drainage section is transported in the wedge/nip section in which the lower and upper belt fabric meet and press the loose cake at 2–4 psi, the cake has reached almost 80% of its final solids content. Ultimately the cake is carried into the secondary higher compression section where it attains final dryness around 30% solids.

In order to simulate the BFP system a Buchner funnel was modified using an all metal funnel in place of the usual plastic funnel to reduce sticking of oil filtrate to the body of the funnel. Instead of the standard perforated bottom, the metal funnel comprised two rubber gaskets above and below a belt fabric. The gaskets were clamped between the funnel and an upper hollow cylinder. The reason for avoiding a perforated base of the type usually employed in a Buchner funnel was to better simultate the condition of free drainage in the gravity and wedge/nip sections of a BFP.

The wedge/nip section (low pressure zone) was simulated by introducing a second belt fabric over the conditioned sludge in the holder followed by a perforated hand compression plate. This combination of the second belt fabric and compression plate provides the necessary condition for nip pressure that the sludge experiences in the wedge/nip section of a BFP.

During a test, the filtrate which drains out by gravity and wedge simulation is collected in a measuring cylinder. In order to determine the dosage for a flocculating polymer the following procedure was adopted in the gravity drainage section.

About 200 mls of conditioned sludge was introduced into the Buchner funnel set up and timed from the moment of filtrate issue out of the funnel into the cylinder. Thereafter at regular intervals (10 seconds) hatch marks were made corresponding to the liquid level on a masking tape applied at different heights on the cylinder. Measurements were made up to 60 seconds. After this period the tape was peeled off and stuck on a graph sheet. Here the height of each 10 second increment was measured and recorded. Qualitative observations were made on dewatering, cake formation, cake strength, filtrate quality and oil break, if any.

The plot of the time divided by the height of the filtrate versus the height of the filtrate is a measure of the dewatering rate of any sludge at a particular dosage. Representation of raw data in curves obtained by such plots presents quantitative information concerning a superflocculated state (dosage corresponding to the lowest slope and intercept of the curve obtained by plotting time divided by the height of the filtrate against the height of the filtrate), peak oil release and peak dewatering rate. Thus, the optimum dosage may be selected for an over-all optimum cake strength and oil recovery. In reality, a plot of time over height of the filtrate versus the height of the filtrate is a curve especially in the region of the optimum dosage.

After the desired dosage is chosen, the wedge section is simulated using a hand compression plate. The filtrate draining from the bottom and top set-up is collected in the cylinder. Any cake squeezing out, cake squeeze-through or belt blinding due to ineffective conditioning will be most significant in this section. After about 10 seconds of compression the Buchner funnel set-up is taken apart and the cake is observed for dryness and strength. The final oil and water fractions collected in the cylinder are measured. Wedge squeeze tests are conducted at dosage levels below and above the optimum. This is to quantify maximum cake strength and peak oil recovery.

The oil recovery is now determined from the above measurements. The percent oil recovery from the sludge will normally be much higher in the cycle on a BFP. This is due to a greater belt surface area and the final filter squeeze out in the secondary high compression section. However, a maximization of oil recovery in the gravity and wedge simulation tests directly corresponds to an efficient program selection for an overall high yield.

Using an experimental testing device of the type previously described samples were either conditioned in a mixing cylinder (six inversions) or in a crystallization dish (gyrational motion up to one minute). The aforementioned curves were then drawn. Based on Darcy's Filtration Equation the dewatering curve with the lowest initial slope and intercept represents a point of minimum specific cake resistance. Hence, a point of incipient superflocculation. This is also a point of minimum squeeze out. Hence, this type of dosage selection also allows for minimization of cake squeeze out. Another advantage of the outlined technique is the ease of obtaining readings of filtrate quantity at set intervals.

By gradually increasing the dosage of polymer flocculant, starting with a relatively low dosage, an improvement is noted in cake formation and strength coupled with faster drainage of filtrate. The turbidity of the filtrate and oil break follow similar trends. At a value slightly below the maximum dewatering the oil drainage is observed to peak coupled with the lowest value in filtrate turbidity. Thereafter as the superflocculant region is approached the oil drainage diminishes and the aqueous phase turbidity is observed to rise.

The term "optimum cake strength" refers to the optimum consistency required in a cake to allow filtrate drainage; yet strong enough to withstand compression without squeezing out or through the belt fabric.

The term "superflocculated state" in terms of dosage is a dosage corresponding to the near maximum dewatering rate; however, yielding turbid filtrate denoting the slight overdose of polymer. This state corresponds to maximum cake strength but lower oil release.

In a typical dewatering/oil recovery system for recovering oil from an oily sludge, the addition of a typical flocculant in stages starting with 200 ppm and increasing in increments of 200 ppm is a poor cake strength at 200 ppm; a cake strength which is still poor at 400 ppm; a fair cake strength with underflocculation at 600 ppm; fair cake strength with peak oil recovery at 800 ppm; peak dewatering with good cake strength at 1000 ppm; excellent cake strength and a superflocculated region at 1200 ppm, poor cake strength and overflocculation at 1400 ppm. Hence, the optimum dosage in this example would be in the range of 800–1200 ppm of flocculant.

Tests were also carried out with and without heating the oily sludge.

As a specific example, an oily sludge containing 17.1% oil, 79.7% water and 2.6% solids was conditioned with 1000 ppm of MAPTAC-acrylamide copolymer at 70° F. and without any treatment by the further addition of an emulsion breaker, 6.8% oil was recovered. When an ethoxylated fatty alcohol sulfate waste oil emulsion breaker at a dosage of 1000 ppm was added immediately after the flocculant the percentage of oil recovery was increased to 9% or a 75% enhancement of oil recovery. At a dosage of the same emulsion breaker under the same conditions of 4000 ppm the percentage of oil recovered was increased to 13.6% or an enhanced recovery of 100%.

When the temperature of the sludge in the foregoing example was raised to 120° F. at a dosage of 1000 ppm of flocculant the percentage of oil recovered was 7.9% without the addition of the emulsion breaker.

Using an oily sludge containing 51% oil, 45% water and 4% solids at a dosage of the same flocculant of 2000 ppm and at a temperature of 130° F. with the addition of the same waste oil emulsion breaker at a dosage of 500 ppm the percentage of oil recovered without the emulsion breaker was 8.6% and with the addition of the emulsion breaker was 15.7% or an increase of 82%.

A test which was otherwise the same except that a waste oil emulsion breaker ethoxylated nonyl phenol as previously described was employed, the percentage of oil recovered was 14.9% or an increase of 73% over the results obtained without the emulsion breaker.

From the foregoing evaluation it is apparent that the dosage of the polymeric flocculant will be that dosage that will be required to attain the superflocculated state and the dosage of the emulsion breaker can vary depending upon the type of oil sludge and the temperature. Usually the dosage of the flocculant will be in the range of 800 to 2000 ppm and the dosage of the emulsion breaker will be in the range of 500-4000 ppm, the lower dosage being used at higher temperatures. Optimum results are also obtained on the oily sludges containing the higher concentrations of oil in excess of about 20% by weight oil and hence it is desirable in most cases to concentrate the lower oil concentration sludges by heating them in order to evaporate some of the water.

In a series of tests an oily sludge containing by weight 17.1% oil, 79.7% water and the remainder solids was treated at 70° F. with 1000 ppm of the MAPTAC-acrylamide copolymer flocculant and 6.8% of the oil was recovered.

When the same treatment was repeated at 120° F. 7.9% of the oil was recovered.

When the treatment was repeated at 70° F. with the addition of 500 ppm of the aforementioned ethoxylated fatty alcohol sulfate 6.8% of the oil was recovered so that the addition of the 500 ppm of the emulsion breaker at the lower temperature did not enhance oil recovery.

The lower oil content sludge was then concentrated to an oil content of 42.7% by weight by evaporation of the water. This more concentrated oily sludge was then treated with 1000 ppm of the MAPTAC-acrylamide copolymer flocculant at 70° F. and 7.4% of the oil was recovered.

The oily sludge was then heated to a temperature of 120° F. and 1500 ppm of the same flocculant was added with the recovery of 10.3% of the oil.

When this last experiment was repeated with the addition of 500 ppm of the ethoxylated fatty alcohol sulfate emulsion breaker the percent of oil recovered was 17.8% or an enhancement of oil recovery of 160% which was more than three times the enhancement of oil recovery without the emulsion breaker.

The invention is hereby claimed as follows:

1. A process for enhancing oil recovery from an oily sludge containing a solid phase, an oil phase and a water phase which consists essentially in adding a positively charged latex flocculant to such sludge and immediately thereafter adding a chemical emulsion breaker which is negatively charged or nonionic, while controlling the proportions of said flocculant and said emulsion breaker to cause the entrapped oil phase to detach from the floc surface of the adsorptive solids and go into the water phase, and mechanically separating the oil from the solids and water.

2. A process as claimed in claim 1 in which said flocculant is a copolymer of methacrylamide propyl dimethyl ammonium chloride and acrylamide.

3. A process as claimed in claim 1 in which said flocculant is a quaternary sulfate of dimethyl amino methacrylate.

4. A process as claimed in claim 1 in which said emulsion breaker is an ethoxylated fatty alcohol sulfate.

5. A process as claimed in claim 1 in which said emulsion breaker is ethoxylated nonylphenol.

6. A process as claimed in claim 1 which is carried out at a temperature of at least 120° F.

7. A process as claimed in claim 1 in which the concentration of oil in the oily sludge is at least 20%.

8. A process as claimed in claim 1 in which the flocculant is a copolymer of methacrylamide propyl dimethyl ammonium chloride and acrylamide, and the emulsion breaker is an ethoxylated fatty alcohol sulfate.

9. A process as claimed in claim 1 in which the flocculant is a copolymer of methacrylamide propyl dimethyl ammonium chloride and acrylamide, and the emulsion breaker is ethoxylated nonylphenol.

* * * * *